United States Patent
Wu

(10) Patent No.: US 6,776,177 B2
(45) Date of Patent: Aug. 17, 2004

(54) GARDENING PROTECTIVE SHELTER IN UMBRELLA SHAPE

(76) Inventor: Chung-Cheng Wu, 1F1., No. 93, Wenming Rd., Gueishan Shiang, Taoyuan Hsien (TW)

( * ) Notice: Subject to any disclaimer, the term of this patent is extended or adjusted under 35 U.S.C. 154(b) by 1 day.

(21) Appl. No.: 10/300,829

(22) Filed: Nov. 21, 2002

(65) Prior Publication Data

US 2004/0099299 A1 May 27, 2004

(51) Int. Cl.$^7$ .............................................. E04H 15/28
(52) U.S. Cl. .......................................... 135/98; 135/135
(58) Field of Search ........................... 135/98, 91, 20.1, 135/20.3, 21, 135

(56) References Cited

U.S. PATENT DOCUMENTS 2,771,087 A * 11/1956 Simonson ................... 135/126
2,864,389 A * 12/1958 Smith et al. .................. 135/98
3,874,397 A * 4/1975 Oberhaus ..................... 135/98
3,889,698 A * 6/1975 Roessl .......................... 135/94
4,304,068 A * 12/1981 Beder ............................ 47/17
4,327,520 A * 5/1982 Saxby et al. ................ 47/29.1
5,259,077 A * 11/1993 Hager et al. .................. 4/498
6,230,728 B1 * 5/2001 Reese .......................... 135/98

* cited by examiner

Primary Examiner—Leslie A. Braun
Assistant Examiner—Amy J. Sterling
(74) Attorney, Agent, or Firm—Birch, Stewart, Kolasch & Birch, LLP

(57) ABSTRACT

A gardening protective shelter in umbrella shape includes a main rod, a plurality of ribs, a protective cover and a handle. The feature of the present invention is a sliding ring wraps around the main rod and is beneath a runner, a pulling rope each ties to the runner and the sliding ring respectively along the main rod and stretches out from the handle, an open ring and a close ring is at the end of the pulling ropes respectively. Users can pull two control rings to open and close the rib for easier installation and restoration.

5 Claims, 8 Drawing Sheets

GARDENING PROTECTIVE SHELTER IN UMBRELLA SHAPE

BACKGROUND OF THE INVENTION

I. Field of the Invention

This invention relates generally to a gardening protective shelter in umbrella shape and, more specifically, to a gardening protective shelter in umbrella shape that has a pulling rope each with control ring on the sliding ring and the runner, by pulling two control rings to open and close the rib for easier installation and restoration.

II. Description of the Prior Art

Heretofore, it is known that many plants are very soft and delicate and have to up grow in a special environment, they can not survive and keep beautiful looking in the natural, open environment, they have to be isolated in a shelter from natural climate and blight to have a proper growing condition.

A known shelter as shown in FIG. 8 is made of a frame (a) and a protective cover (b), the protective cover (b) covers and is fixed onto the frame (a).

Based on above structure, the frame (a) surrounds the plants, the protective cover (b) covers and is fixed onto the frame (a); such mechanism can isolate those plants and achieve a temperature and humidity stable environment. The isolated environment is less influenced by outside weather variation, such as rain and wind for a better growing condition.

However the known prior art has to have the frame (a) fixed and surrounded the plants and have the protective cover (b) covers and is fixed onto the frame (a), which introduces inconvenience while moving and dismantling.

SUMMARY OF THE INVENTION

It is therefore a primary object of the invention to provide a gardening protective shelter in umbrella shape that applies the open ring and close ring connecting to the sliding ring and the runner respectively, users can just pull the rings to open and close the present invention to achieve more convenience and better mobility purpose.

In order to achieve the objective set forth, a gardening protective shelter in umbrella shape in accordance with the present invention comprises a main rod, a plurality of ribs, a protective cover and a handle. The main rod has an indention with a runner stopper stemming out of the main rod; a finish ring is fixed on the main rod, a runner wraps around the main rod and is beneath the finish ring; the rib ends and the stretchers of the ribs are tied to the finish ring and the runner respectively. A center hole of the protective cover passes through the top of the main rod and is fastened to the finish ring; the handle further fixes the center hole from top of the main rod. Each end of the protective cover has a tip overall to wrap the tip at end of the each rib.

The major feature: a sliding ring wraps around the main rod and is beneath the runner, a pulling rope each ties to the runner and the sliding ring respectively along the main rod and stretches out from the handle, an open ring and a close ring is at the end of the pulling ropes respectively.

Based on above structure, users can pull the open ring linking to the runner that can stretch out the present invention, such operation can pull the runner up along the main rod and push up the rib, the protective cover is also stretched out; the runner is pulled tip and held by the runner stopper of the main rod to have the protective cover maintains in opening condition; users can pull the close ring linking to the sliding ring to close the present invention, the sliding ring moves up along the main rod and presses the runner stopper down to the indention, the runner then is pushed downward by the tension of the ribs and closes the ribs.

While applying, users can plug and fix the main rod on ground, then pull the open ring having runner to prop out the ribs; users can pull the close ring and have the sliding ring to close the ribs; such mechanism is easy for installation and restoration to achieve convenience and mobility purpose.

BRIEF DESCRIPTION OF THE DRAWINGS

The accomplishment of the above-mentioned object of the present invention will become apparent from the following description and its accompanying drawings which disclose illustrative an embodiment of the present invention, and are as follows.

DESCRIPTION OF THE PREFERRED EMBODIMENT

Figure 1:
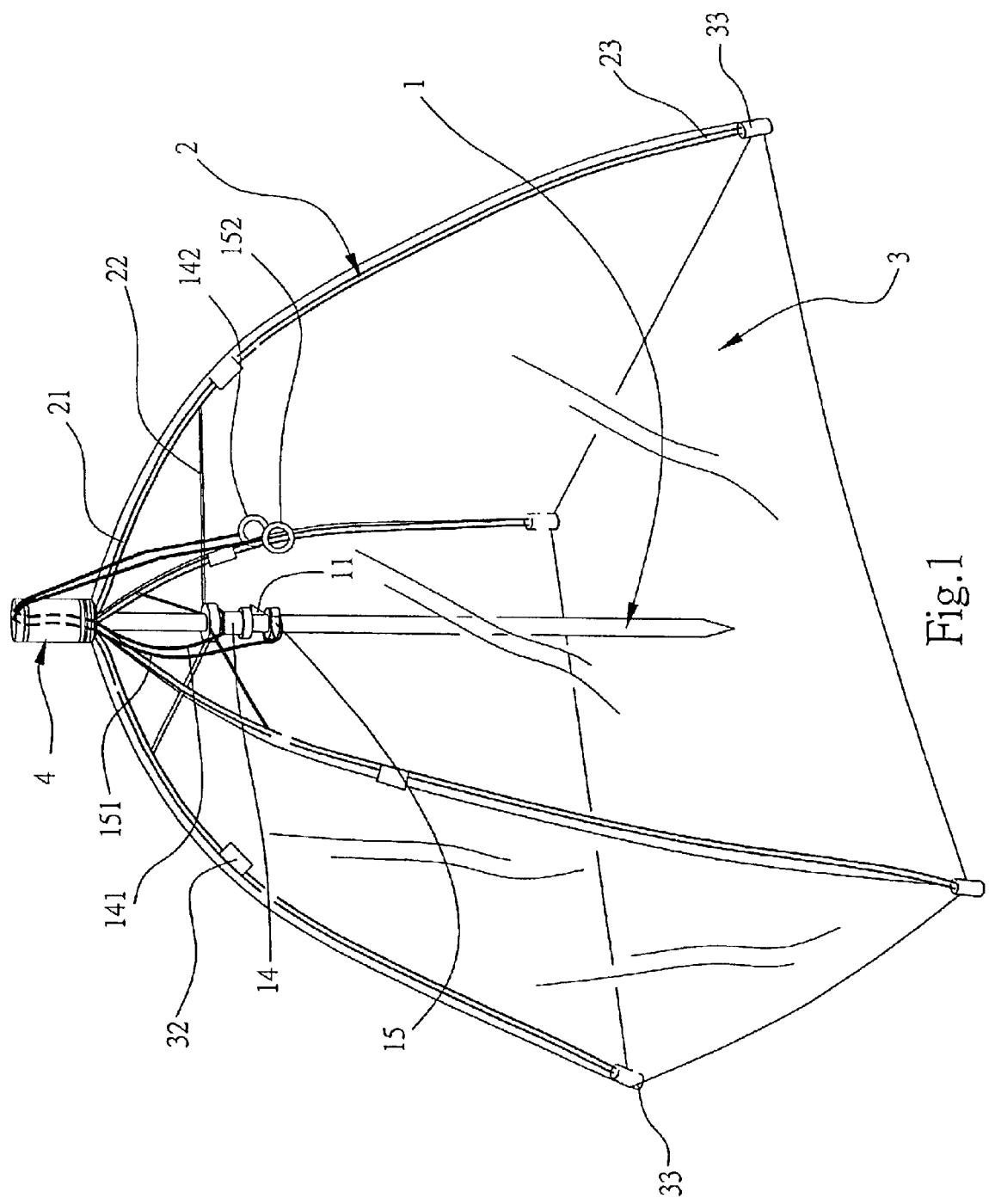
FIG. 1 is a perspective view of the present invention.

Referring to FIG. 1, the present invention is composed of a main rod (1), a plurality of rib (2), a protective cover (3) and a handle (4). The functions of each component are described below:

The main rod (1) is longer than the rib (2) vertically, the main rod (1) has an indention with a runner stopper (11) stemming out of the main rod (1); a finish ring (13) is fixed on the main rod (1), a runner (14) wraps around the main rod (1) and is beneath the finish ring (13); the rib end (21) and the stretcher (22) of the rib (2) are tied to the finish ring (13) and the runner (14) respectively. A center hole (31) of the protective cover (3) passes through the top of the main rod (1) and is fastened to the finish ring (13); the handle (4) further fixes the center hole (31) from top of the main rod (1). Each end of the protective cover (3) has a tip overall (33) to wrap the tip (23) at end of the each rib (2).

Figure 2:
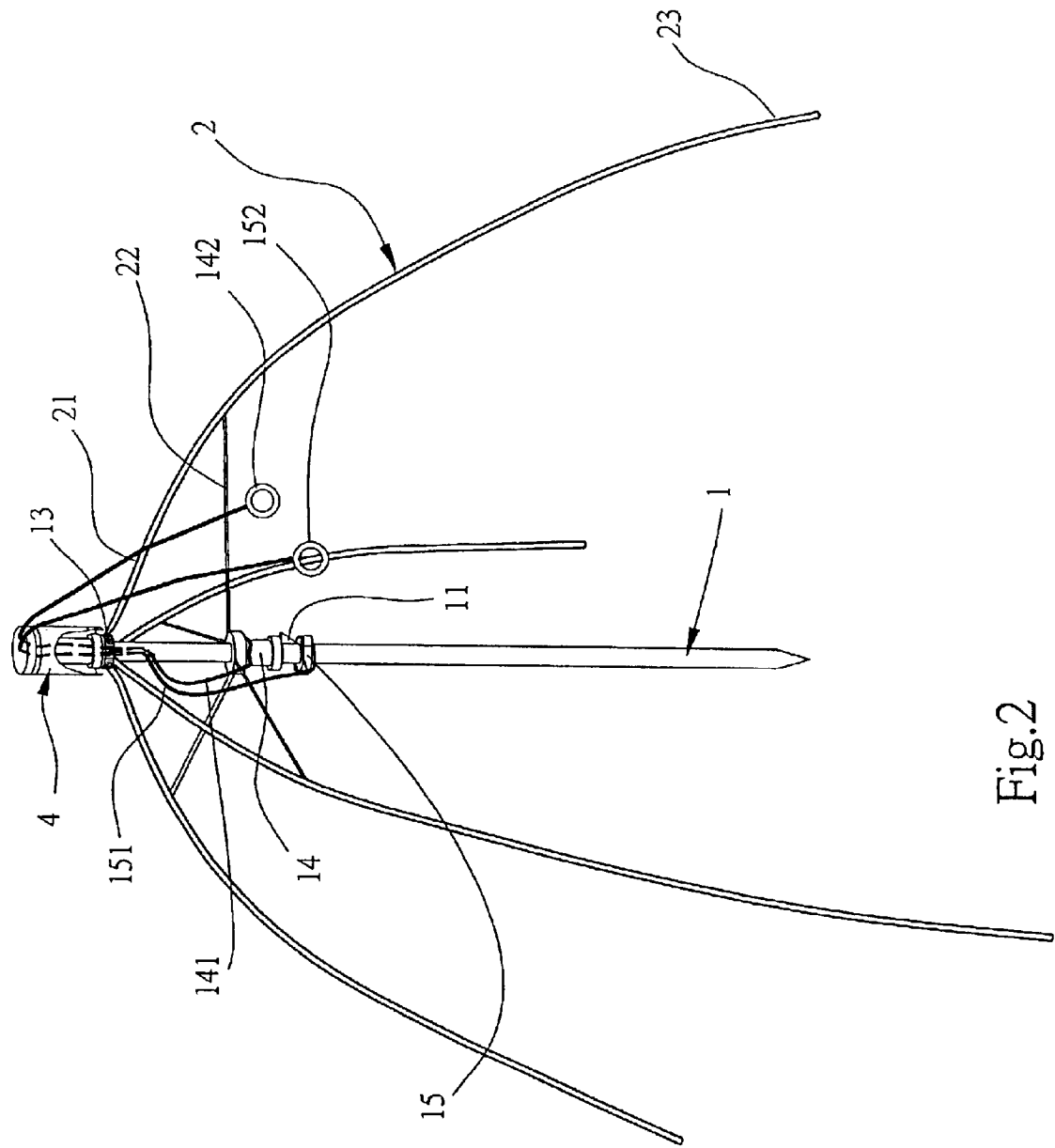
FIG. 2 is a perspective view of the main rod and the ribs of the present invention.
Figure 3:
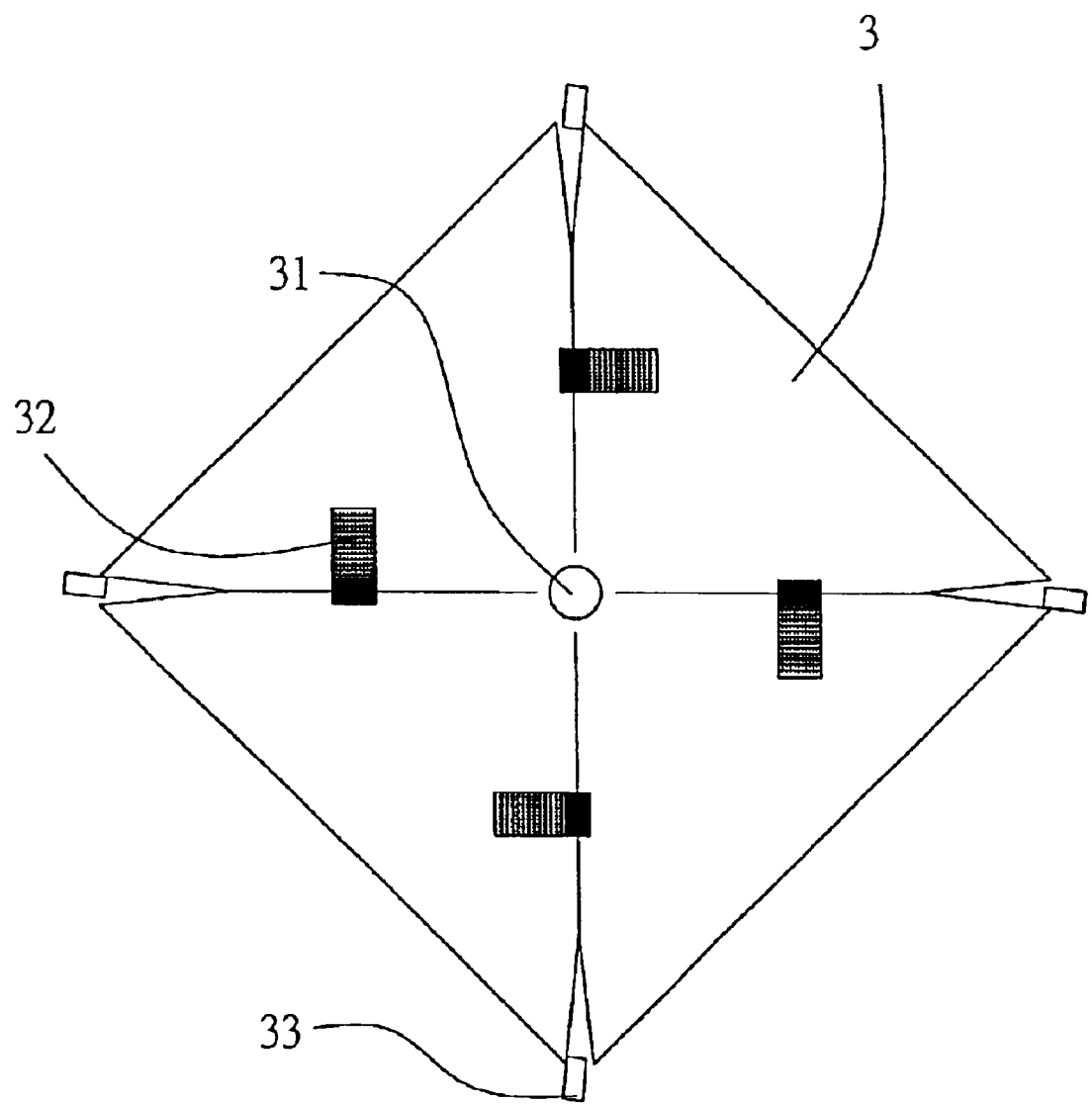
FIG. 3 is a perspective view of the protective cover of the present invention.

The major feature of the present invention is that a sliding ring (15) wraps around the main rod (1) and is beneath the runner (14), a pulling rope (141, 151) each ties to the runner (14) and the sliding ring (15) respectively along the main rod (1) and stretches out from the handle (4), an open ring (142) and a close ring (152) is at the end of the pulling rope (141, 151) respectively, as shown in FIG. 1 and FIG. 2. A plurality number of sticker (32) are on the protective cover (3), each sticker (32) is on the location of the rib (2), as shown in FIG. 1 and FIG. 3.

Based on above structure, users can pull the open ring (142) linking to the runner (14) that can stretch out the present invention, such operation can pull the runner (14) up along the main rod (1) and push up the rib (2), the protective cover (3) is also stretched out; the runner (14) is pulled up and held by the runner stopper (11) of the main rod (1) to have the protective cover (3) maintains in opening condition; users can pull the close ring (152) linking to the sliding ring (15) to close the present invention, the sliding ring (15) moves up along the main rod (1) and presses the runner stopper (11) down to the indention, the runner (14) then is pushed downward by the tension of the rib (2) and closes the rib (2).

While applying, users can plug and fix the main rod (1) on ground, then pull the open ring (142) having runner (14) to prop out the rib (2); users can pull the close ring (152) and have the sliding ring (15) to close the rib (2); such mechanism is easy for installation and restoration to achieve convenience and mobility purpose. A plurality numbers of sticker (32) are on the protective cover (3), each sticker (32) is on the location of the rib (2); when users place the protective cover (3), the sticker (32) can fasten the protective cover (3) and the rib (2) firmly together; while replacing the protective cover (3), users can tear off the sticker (32) for easy replacement.

Figure 4:
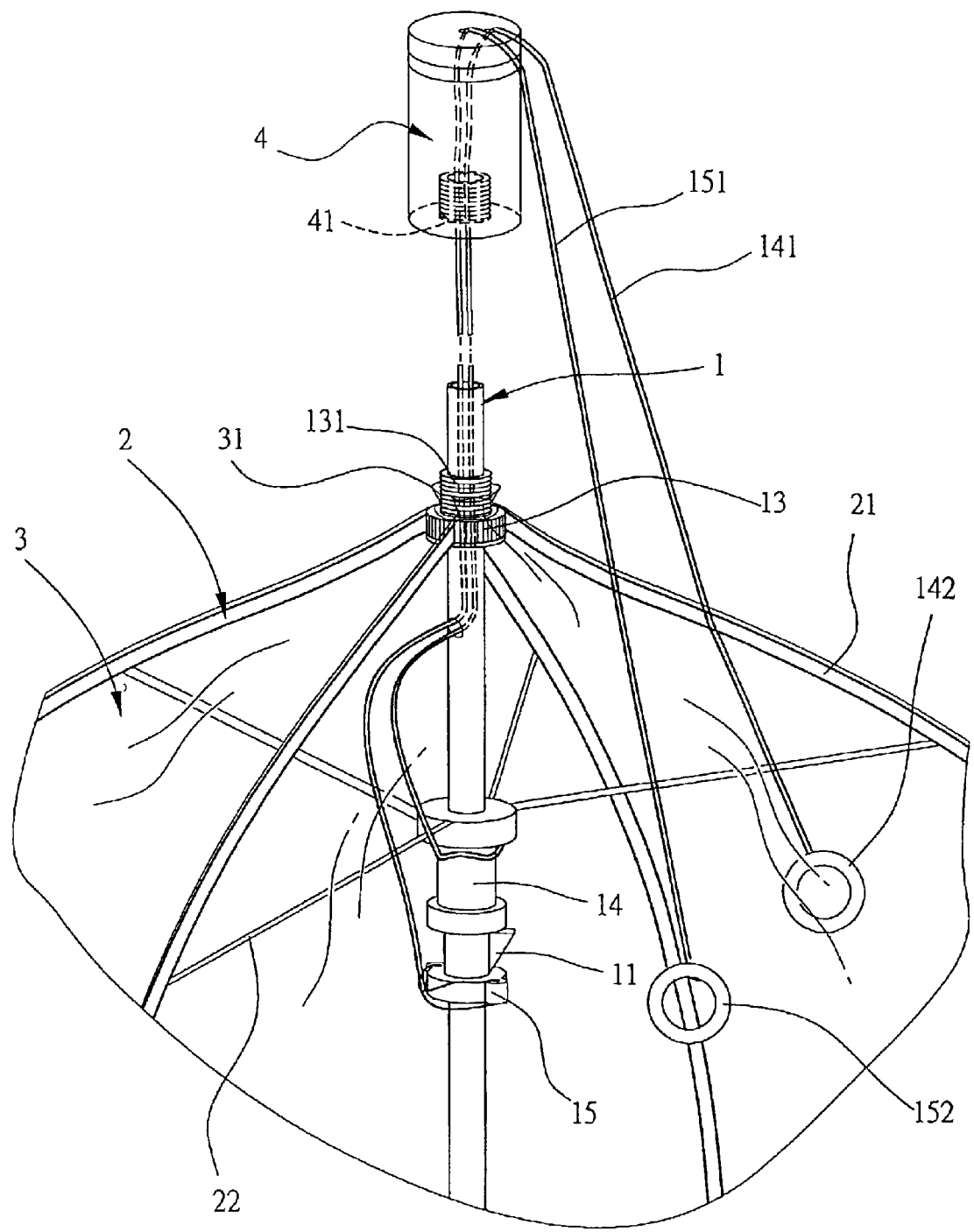
FIG. 4 is an application perspective view of the finish ring of the present invention.
Figure 5:
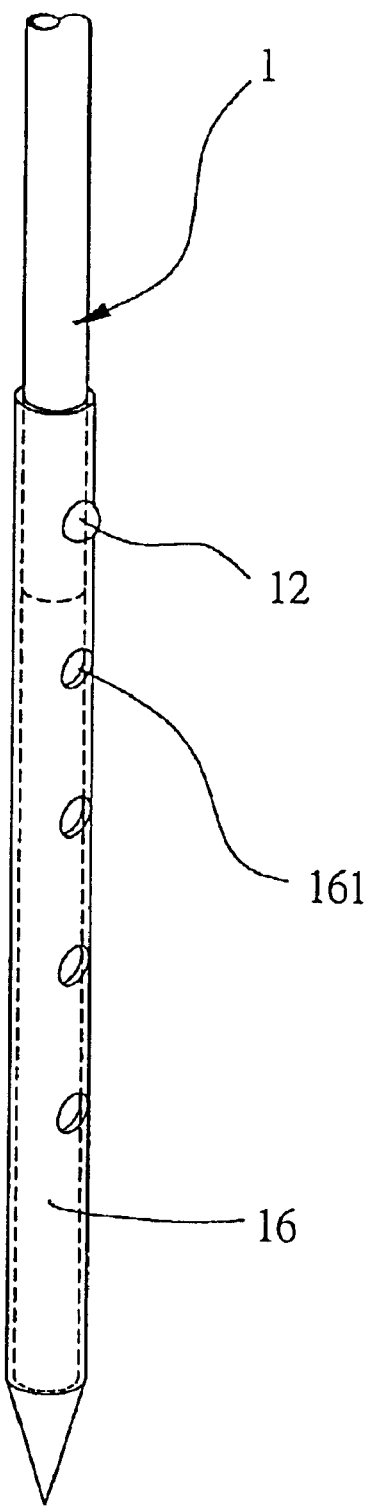
FIG. 5 is an application perspective view of the main rod and pipe of the present invention.

An application example as shown in FIG. 4, the finish ring (13) is covered with thread (131), a nut (41) corresponding to the thread (131) is on the handle (4); the center hole (31) of the protective cover (3) is placed on the finish ring (13) first, and fastened with the nut (41). As shown in FIG. 5, a tenon (12) is on the bottom of the main rod (1), a pipe (16) with a plurality number of adjust hole (161) corresponding to the tenon (12) can be inserted from the bottom of the main rod (1), the tenon (12) and the adjust hole (161) can be adjust the length of the pipe (16).

Figure 6:
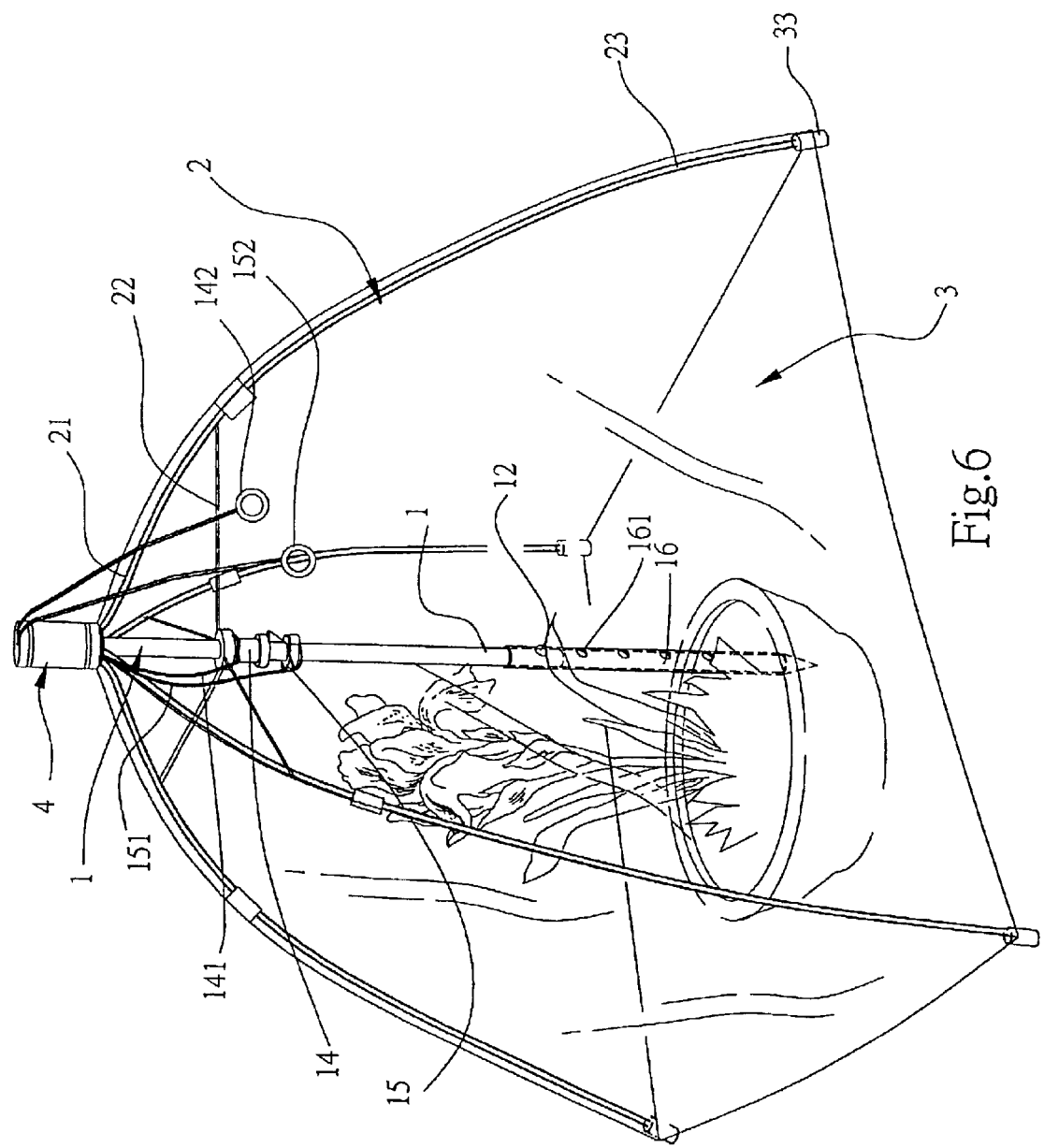
FIG. 6 is an example of the present invention.

Based on above structure and as shown in FIG. 6, the protective cover (3) can be further fastened; by adjusting the length of the pipe (16) on the bottom of the main rod (1) can make the length of the rib (2) shorter than the total length, the main rod (1) and the pipe (16) can be plugged into ground firmly.

Figure 7:
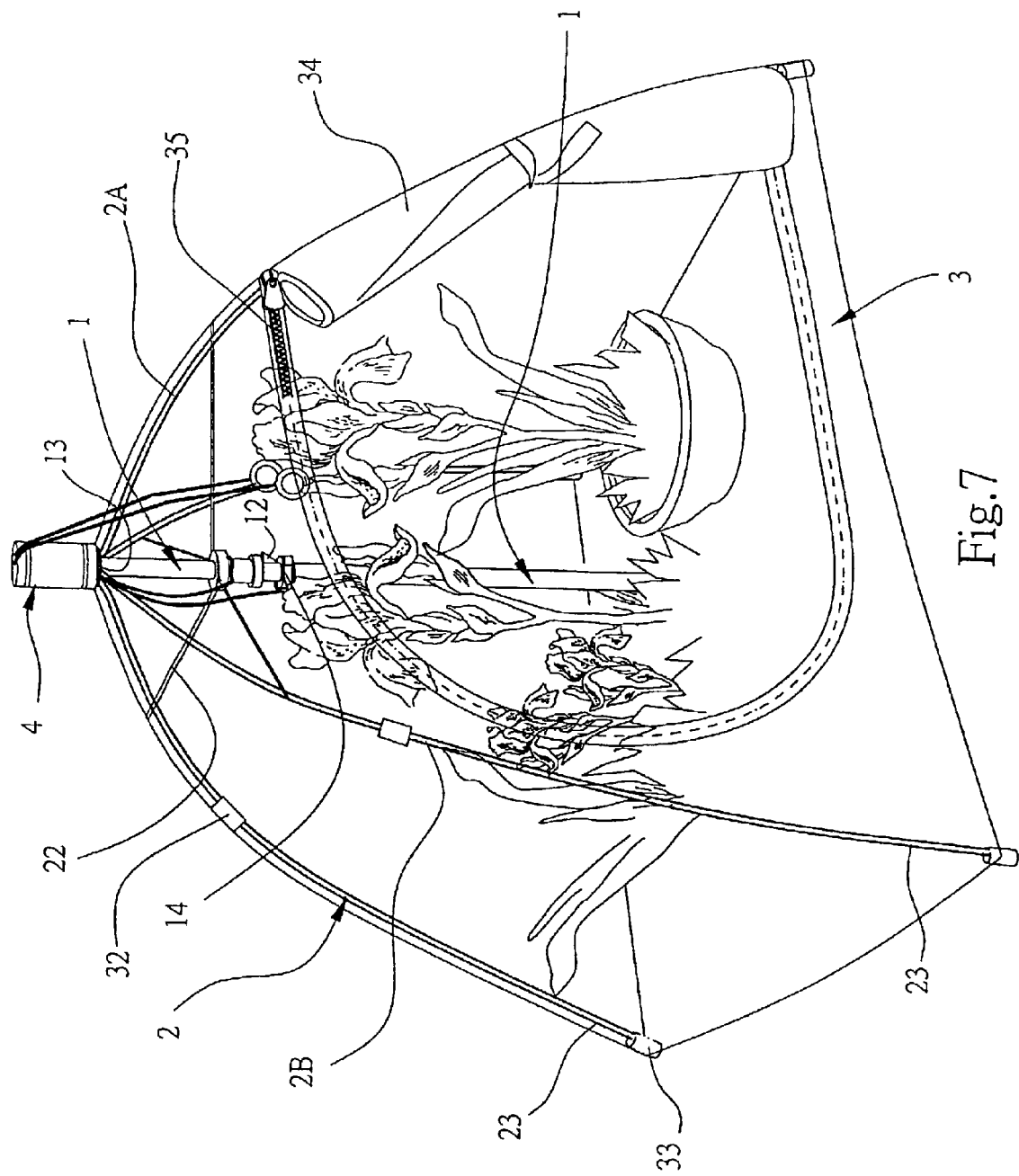
FIG. 7 is another example of the present invention.
Figure 8:
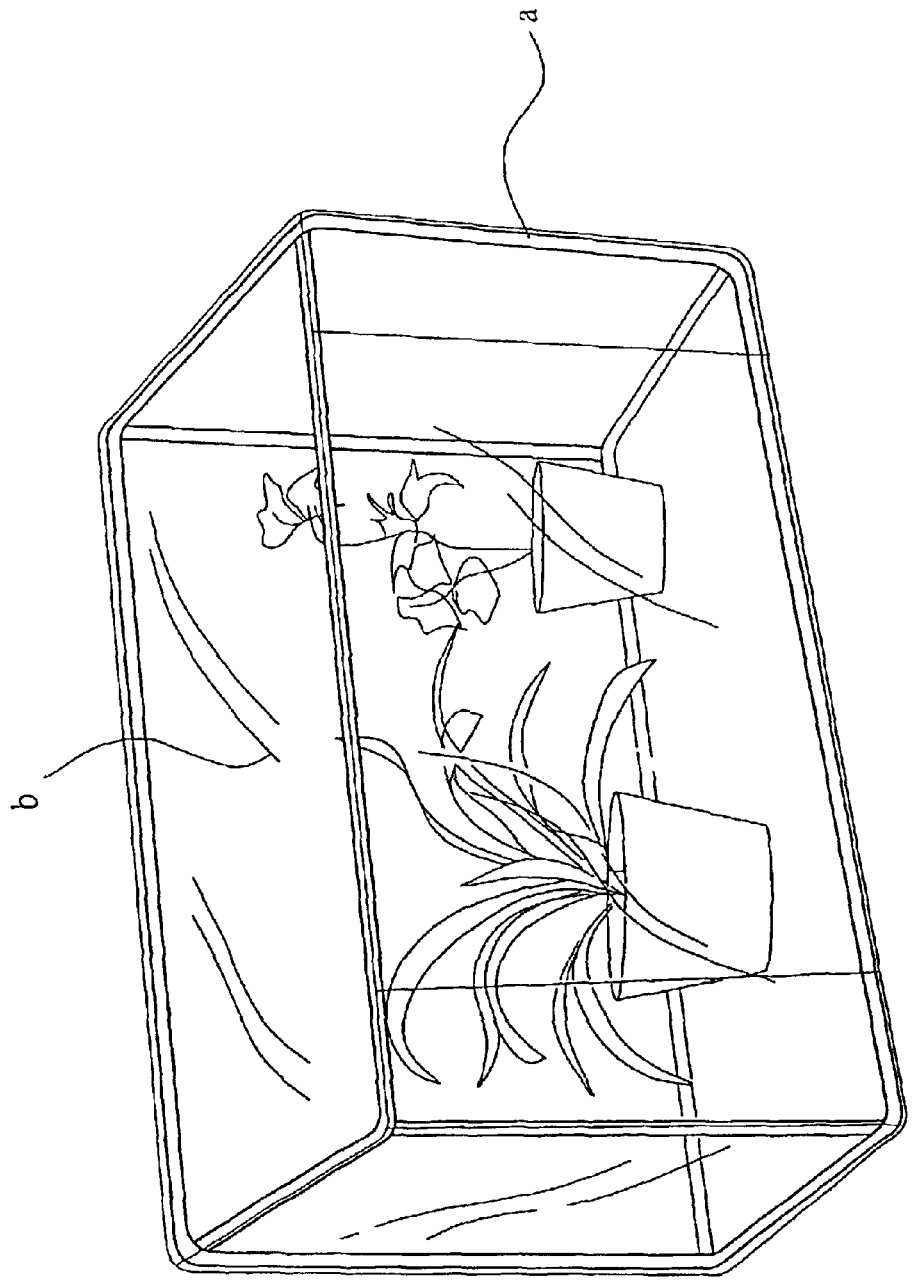
FIG. 8 is a perspective view of the prior art.

Another application example as shown in FIG. 7, a curve (34) is on the protective cover (2) between the first rib (2A) and the second rib (2B) of the rib (2), a zipper (33) is on the curve (34) and the protective cover (3) to link them together. The curve (34) can be pulled out to form an open on the protective cover (3), such mechanism is easy for users to do the alteration and organization of the plants inside.

While a preferred embodiment of the invention has been shown and described in detail, it will be readily understood and appreciated that numerous omissions, changes and additions may be made without departing from the spirit and scope of the invention.

What is claimed is:

1. A gardening protective shelter in umbrella shape comprising:

a main rod having an indentation with a runner stopper stemming out thereof, a finish ring fixed thereon, a runner and a sliding ring wrapped around;

a plurality of ribs having a rib end, a stretcher and a tip, a protective cover having a center hole and a tip overall, a handle, pulling ropes, an open ring and a close ring, wherein said runner is disposed beneath said finish ring, said rib end and said stretcher are connected to said finish ring and said runner respectively; said center hole of the protective cover passes through the top of said main rod, being fastened to said finish ring; said handle fixes said center hole from top of said main rod; said tip overall on each end of said protective cover wraps said tip at the end of said rib;

the improvement of the present invention is characterized in that:

said sliding ring wrapped around said main rod is disposed beneath said runner; said runner and said sliding ring are connected to each pulling rope respectively along said main rod, said pulling ropes stretch out from said handle; said open ring and said close ring is arranged at the end of each of said pulling ropes respectively.

2. The gardening protective shelter in umbrella shape recited in claim 1, wherein a plurality of stickers are located on said protective cover, each of said stickers is on the location of said rib to fasten said protective cover and said rib firmly together.

3. The gardening protective shelter in umbrella shape recited in claim 1, wherein said finish ring is covered with threads, a nut corresponding to said threads is located on said handle, said center hole of said protective cover is placed on said finish ring first, and fastened with said nut.

4. The gardening protective shelter in umbrella shape recited in claim 1, wherein a tenon is located on the bottom of said main rod, a pipe with a plurality of adjust holes corresponding to said tenon is inserted from the bottom of said main rod, said tenon and said adjust hole adjust the length of said rope.

5. The gardening protective shelter in umbrella shape recited in claim 1, wherein a curve is located on said protective cover between the two ribs of said ribs, a zipper is on said curve and protective cover to link them together.

* * * * *